Oct. 18, 1932.  F. BURDICK  1,882,771

FISHING REEL

Filed June 14, 1930

INVENTOR
Frank Burdick
BY
Chappell Earl
ATTORNEYS

Patented Oct. 18, 1932

1,882,771

UNITED STATES PATENT OFFICE

FRANK BURDICK, OF KALAMAZOO, MICHIGAN, ASSIGNOR TO SHAKESPEARE COMPANY, OF KALAMAZOO, MICHIGAN

FISHING REEL

Application filed June 14, 1930. Serial No. 461,228.

My improvements are especially designed by me for embodiment in spring winding fishing reels of the type illustrated in Letters Patent No. 1,510,904, issued October 7, 1924 to Samuel G. Russell, and I have illustrated the same as embodied in such a structure. My improvements are, however, adaptable and desirable for use in other types of fishing reels.

The main objects of this invention are:

First, to provide an improved brake means which facilitates the stripping of the line in fly casting and the like.

Second, to provide a brake means which is automatically released by a pull on the line so that the line can be freely pulled or stripped from the reel, the brake acting on release of the tension on the line to prevent the spring from rewinding the line and manually operated means being provided for rendering the brake means inoperative.

Third, to provide a brake means of the character indicated which is arranged so that strain on the parts resulting from the braking action is minimized and does not tend to distort the spool as results from the type of manually operated brakes commonly employed in spring wind reels. The arrangement has the further advantage of permitting the use of relatively light materials.

Fourth, to provide a brake mechanism for spring wind reels which may be released with little effort on the part of the operator.

Objects pertaining to details and economies of my invention will definitely appear from the description to follow. The invention is defined in the claims.

A structure which embodies the features of my invention is clearly illustrated in the accompanying drawing, in which:

Fig. 8 is a detail section through the brake shoe on line 8—8 of Fig. 3.

Fig. 9 is a detail section on line 9—9 of Fig. 3.

Figure 1:
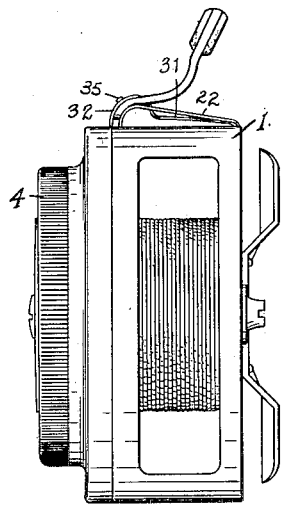
Fig. 1 is a side view of a spring winding fishing reel embodying the features of my invention.

Referring to the drawing, the casing designated generally by the numeral 1 is designed to receive the spool 2 and the winding spring 3 housed within a spring casing 4. The winding spring is provided with a barrel or hub 5 mounted on the spindle 6 and provided with a ratchet 7 coacting with the ratchet 8 on the driving gear 9.

This driving gear is axially movable on the spindle and provided with a spring 10 yieldingly urging its ratchet into engagement with the ratchet 7. The driving gear is connected to the spool by a train of gears consisting of the pinion 11 meshing with the driving gear and a gear 12 which is connected to the pinion 11 and meshes with a pinion 13 on the spool hub 113. This hub carries friction disks 114 engaging the annular shoulders 115 on the spool flanges 116, thereby providing a friction driving connection for the spool to its hub, this friction being sufficient to drive the spool under usual conditions.

My improved brake means comprises a brake wheel 14 having a V-shaped periphery 15. This brake wheel is mounted on the stub shaft 16 and is provided with a pinion 17 meshing with the gear 12 so that the brake wheel has a driving connection with the spring and spool through the connecting train of gears.

The brake shoe is eccentrically pivoted at 19; that is, the face of the shoe is eccentric relative to its pivot so that movement of the brake shoe in the direction of travel of the periphery of the brake wheel tends to further engage the brake and force it into engagement with the brake wheel.

The spring 20 is mounted on the pivot 19, one arm of which engages the casing and the other arm the brake so it acts to urge the brake into engagement with the brake wheel.

Figure 3:
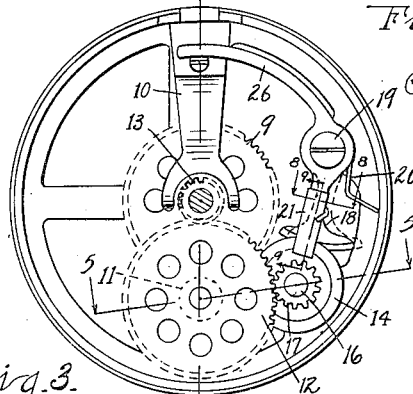
Fig. 3 is a fragmentary view on line 3—3 of Fig. 2 showing details of the brake mechanism, the parts being shown in engaged position.
Figure 7:
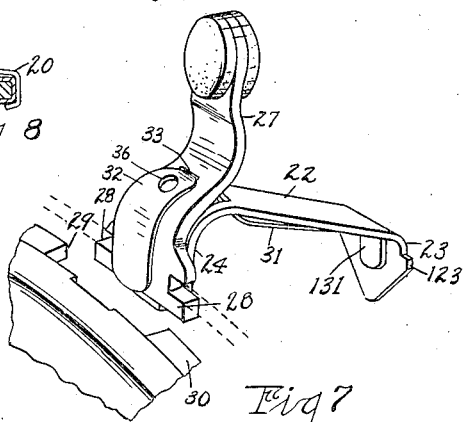
Fig. 7 is a fragmentary perspective view of portions of the casing or frame and the brake releasing member in dis-assembled relation.
Figure 5:
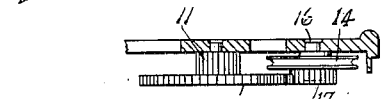
Fig. 5 is a fragmentary section on line 5—5 of Fig. 3 illustrating the relation of the braking wheel to the driving gears.
Figure 6:
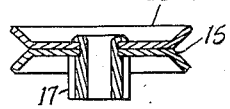
Fig. 6 is an enlarged section through the brake wheel.

In the embodiment illustrated, I provide a spring finger or friction member 21 which coacts with the side of the brake wheel so that when the line is pulled or stripped from the reel, it serves to disengage the brake shoe, thereby reducing the wear of the V-shaped face of the shoe on the V-shaped brake wheel. This results from the fact that the brake wheel 14, when the line is stripped from the slot, rotates in a clockwise direction when viewed as in Fig. 3, so that the friction finger 21 swings the shoe from the face of the wheel. Without this, it will be understood that while the brake is released when the line is stripped, it would still have a sliding or frictional engagement with the periphery of the wheel.

The brake is connected in the train of gears so that it is automatically engaged on the winding rotation of the spool and automatically released on the unwinding rotation thereof. This permits free stripping or pulling out of the line but automatically prevents the action of the spring winding up the line while the brake is in operative position.

To render the brake inoperative, I provide a yoke-shaped releasing lever 22, its arm 23 having laterally projecting lugs 123 engaged within the casing to provide a pivotal support and retaining means for the lever.

The arm 24 of the lever is arranged through an opening 25 in the casing in coacting relation to the arm 26 of the brake shoe.

Figure 2:
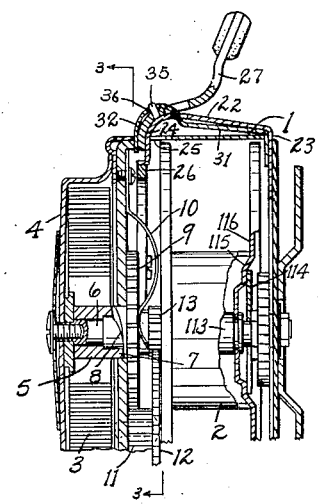
Fig. 2 is a fragmentary view mainly in section on line 2—2 of Fig. 3, the parts being shown in brake releasing position.
Figure 4:
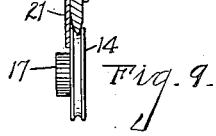
Fig. 4 is a fragmentary section corresponding to that of Fig. 2 with the parts in brake engaging position.

The releasing lever is provided with a finger piece 27. This finger piece is provided with slots 28 which engage the edges of an opening 29 in the casing member 30 so that the finger piece is supported for tilting movement. The finger piece is curved to overlie the releasing lever so that as the finger piece is actuated or moved to the right with the parts in position shown in Figs. 1, 2 and 4 of the drawing, the arm 24 of the releasing lever is forced inwardly into engagement with the arm 26 of the brake shoe.

To lock the brake in released position, I provide a spring detent member 32 which is arranged through an opening 33 in the finger piece and through an opening 34 in the releasing member and provided with an arm 31 disposed below the releasing member and laterally turned at 131 to project through the opening in the casing provided for the arm 123 of the releasing member.

The detent or latching member 32 has a hole 36 therein adapted to receive a pin 35 in the finger piece 27 when the finger piece is actuated to move the releasing member to brake releasing position.

With this arrangement of parts no screws are required in assembling the brake control mechanism. They are quickly and easily assembled and at the same time effectively retained in assembled relation.

With the parts thus arranged the braking stress is applied so that it does not tend to distort the spool and is highly efficient, that is, a relatively small amount of braking power is sufficient for the purpose. The brake when released or free to act is automatically engaged by the winding rotation of the reel and at the same time permits free unwinding rotation thereof.

I have illustrated and described my improvements in an embodiment which I have found highly satisfactory. I have not attempted to illustrate other embodiments and adaptations as it is believed that this disclosure will enable those skilled in the art to embody or adapt my improvements as may be desired.

Having thus described my invention, what I claim as new and desire to secure by Letters Patent, is:

1. The combination in a spring winding reel, of a casing, a spool, a driving gear, a driving spring operatively associated with said driving gear, a train of gears connecting said driving gear to said spool, a brake wheel having a V-shaped periphery and provided with a pinion coacting with one of the gears of said train of gears, an eccentric pivotally mounted brake shoe having a face of V-cross section coacting with the periphery of said brake wheel and provided with a releasing arm, a spring acting to urge said brake shoe to engaging position, the brake wheel being driven so that the brake is automatically engaged on the winding rotation of the spool and automatically released on the unwinding rotation thereof, and a brake releasing member mounted on said casing to coact with said arm on said brake shoe and provided with a detent for holding the brake in released position.

2. The combination in a spring winding reel, of a casing, a spool, a driving gear, a driving spring operatively associated with said driving gear, a train of gears connecting said driving gear to said spool, a brake wheel having a V shaped periphery and provided with a pinion coacting with one of the gears of said train of gears, an eccentric pivotally mounted brake shoe having a face of V cross section coacting with the periphery of said brake wheel and provided with a releasing arm, a spring acting to urge said brake shoe to engaging position, the brake wheel being driven so that the brake is automatically engaged on the winding rotation of the spool and automatically released on the unwinding rotation thereof, and a brake releasing member coacting with said arm on said brake shoe.

3. The combination in a spring winding reel, of a casing, a spool, a driving gear, a driving spring operatively associated with said driving gear, a train of gears connecting said driving gear to said spool, a brake wheel having a V-shaped periphery and provided with a pinion coacting with one of the gears of said train of gears, an eccentric pivotally mounted brake shoe having a face of V-cross section coacting with the periphery of said brake wheel and provided with a releasing arm, a spring acting to urge said brake shoe to engaging position, the brake wheel being driven so that the brake is automatically engaged on the winding rotation of the spool and automatically released on the unwinding rotation thereof, a spring friction brake releasing member mounted on said brake shoe to coact with a side of the brake wheel, and a brake releasing member coacting with said arm on said brake shoe.

4. The combination in a spring winding reel, of a casing, a spool, a driving gear, a driving spring operatively associated with said driving gear, a train of gears connecting said driving gear to said spool, a brake wheel operatively associated with said train of gears intermediate said driving spring and spool, a pivotally mounted brake shoe coacting with the periphery of said brake wheel, a spring acting to urge said brake shoe to engaging position, the brake wheel being driven so that the brake is automatically engaged on the winding rotation of the spool and automatically released on the unwinding rotation thereof, and a manually operated brake releasing member mounted on said casing to coact with said brake shoe and provided with a detent for holding the brake in released position.

5. The combination in a spring winding reel, of a casing, a spool, a driving gear, a driving spring operatively associated with said driving gear, a train of gears connecting said driving gear to said spool, a brake wheel operatively associated with said train of gears intermediate said driving spring and spool, a pivotally mounted brake shoe coacting with the periphery of said brake wheel, a spring acting to urge said brake shoe to engaging position, the brake wheel being driven so that the brake is automatically engaged on the winding rotation of the spool and automatically released on the unwinding rotation thereof, and a manually operated brake releasing member coacting with said brake shoe.

6. The combination in a spring winding reel comprising a spool and a driving spring, of a driving connection for said driving spring to said spool, a brake wheel having a V shaped periphery operatively associated with said driving connection to be driven therewith, a brake shoe having a face of V cross section pivotally mounted to coact with the periphery of said brake wheel, a spring acting to urge said brake shoe to engaging position so that the brake is automatically engaged on the winding rotation of the spool and automatically released on the unwinding rotation thereof, and a manually operated means for holding said brake in released position.

7. The combination in a spring winding reel comprising a spool and a driving spring, of a driving connection for said driving spring to said spool, a brake wheel operatively associated with said driving connection between said spring and spool, a brake shoe mounted to coact with the periphery of said brake wheel, a spring acting to urge said brake shoe to engaging position so that the brake is automatically engaged on the winding rotation of the spool and automatically released on the unwinding rotation thereof, and a manually operated means for holding said brake in released position.

8. The combination in a spring winding fishing reel comprising a spool and a driving spring, of a driven brake wheel operatively associated with said driving spring and spool and having a grooved periphery a brake coacting with the said grooved periphery of said brake wheel and acting to automatically release on the unwinding rotation of the spool and automatically engage on the winding rotation of the spool, and manually operated means for releasing said brake, said means being provided with a detent for holding it in brake releasing position.

9. The combination in a spring winding fishing reel comprising a spool and a driving spring, of a driven brake wheel operatively associated with said driving spring and spool and having a grooved periphery, a brake coacting with the said grooved periphery of said brake wheel and acting to automatically release on the unwinding rotation of the spool and automatically engage on the winding rotation of the spool.

10. The combination in a spring winding reel comprising a spool and a driving spring, of a driving connection for said driving spring to said spool, a brake wheel operatively associated with said driving connection between said spring and spool, a brake shoe coacting with said brake wheel, a spring acting to urge said brake shoe to engaging position so that the brake is automatically engaged on the winding rotation of the spool and automatically released on the unwinding rotation thereof, and a manually operated means for holding said brake in released position.

11. The combination in a spring winding fishing reel comprising a spool and a driving spring, of a driven brake wheel operatively associated with said driving spring and spool and having a grooved periphery, a brake coacting with said grooved periphery of brake wheel and acting to automatically release on the unwinding rotation of the spool and automatically engage on the winding rotation of the spool, and manually operated means for releasing said brake.

12. The combination in a spring winding fishing reel comprising a spool and a driving spring, of a driven brake wheel operatively associated with said driving spring, a brake coacting with said brake wheel and acting to automatically release on the unwinding rotation of the spool and automatically engage on the winding rotation of the spool, a spring member coacting with a portion of said brake wheel other than the surface with which said brake shoe coacts for moving said brake shoe out of frictional engagement with said brake wheel on the unwinding rotation of the spool, and manually operated means for releasing said brake.

13. The combination in a spring winding fishing reel comprising a spool and a driving spring, of a driven brake wheel operatively associated with said driving spring, a brake coacting with said brake wheel and acting to automatically release on the unwinding rotation of the spool and automatically engage on the winding rotation of the spool, a member coacting with said brake wheel for moving said brake shoe out of frictional engagement with said brake wheel on the unwinding rotation of the spool, and manually operated means for releasing said brake.

14. The combination in a spring winding fishing reel, of a driving spring, a spool, a driving connection for said spring to said spool comprising a train of gears and a friction driving element, a brake wheel provided with a pinion coacting with one of the gears of said train of gears in advance of said friction driving element, a brake coacting with said brake wheel and acting to automatically release on the unwinding rotation of the spool and automatically engage on the winding rotation of the spool, and manually operated means for releasing said brake.

15. The combination in a spring winding fishing reel, of a driving spring, a spool, a driving connection for said spring to said spool comprising a train of gears and a friction driving element, a brake wheel provided with a pinion coacting with one of the gears of said train of gears in advance of said friction driving element, a brake coacting with said brake wheel, and manually operated means for releasing said brake.

16. The combination in a spring winding fishing reel, of a driving spring, a spool, a driving connection for said spring to said spool comprising a train of gears, a brake wheel provided with a pinion meshing with one of the gears of said train of gears, a brake coacting with said brake wheel and acting to automatically release on the unwinding rotation of the spool and automatically engage on the winding rotation of the spool, and manually operated means for releasing said brake.

17. The combination in a spring winding fishing reel, of a driving spring, a spool, a driving connection for said spring to said spool comprising a train of gears, a brake wheel provided with a pinion meshing with one of the gears of said train of gears, a brake coacting with said brake wheel, and manually operated means for releasing said brake.

18. The combination in a spring winding fishing reel comprising a spool, a driving spring and a driving connection for said spring to said spool including a friction element, a brake mechanism associated with said driving connection in advance of the friction element, and manually operated means for releasing said brake.

19. The combination in a spring winding fishing reel comprising a spool, a driving spring and a driving connection for said spring to said spool, of a brake mechanism including a driven element associated with said driving connection intermediate said spool and driving spring, a shoe coacting with said driven element, and manually operated means for releasing said shoe.

In witness whereof I have hereunto set my hand.

FRANK BURDICK.